United States Patent
Fu et al.

(10) Patent No.: US 11,499,072 B2
(45) Date of Patent: Nov. 15, 2022

(54) COMPOSITION AND METHOD FOR CONDUCTING A MATERIAL REMOVING OPERATION

(71) Applicant: SAINT-GOBAIN CERAMICS & PLASTICS, INC., Worcester, MA (US)

(72) Inventors: Lin Fu, Rancho Palos Verdes, CA (US); Jason A. Sherlock, Anaheim, CA (US); Long Huy Bui, Orange, CA (US); Douglas E. Ward, Santa Ana, CA (US)

(73) Assignee: SAINT-GOBAIN CERAMICS & PLASTICS, INC., Worcester, MA (US)

(*) Notice: Subject to any disclaimer, the term of this patent is extended or adjusted under 35 U.S.C. 154(b) by 159 days.

(21) Appl. No.: 17/004,931

(22) Filed: Aug. 27, 2020

(65) Prior Publication Data

US 2021/0062042 A1 Mar. 4, 2021

Related U.S. Application Data

(60) Provisional application No. 62/894,029, filed on Aug. 30, 2019.

(51) Int. Cl.
| | | |
|---|---|---|
| C09G 1/02 | (2006.01) |
| C01B 35/12 | (2006.01) |
| C01F 7/02 | (2022.01) |
| C01G 25/02 | (2006.01) |
| C01G 45/12 | (2006.01) |

(52) U.S. Cl.
CPC ............. C09G 1/02 (2013.01); C01B 35/127 (2013.01); C01F 7/02 (2013.01); C01G 25/02 (2013.01); C01G 45/1207 (2013.01)

(58) Field of Classification Search
None
See application file for complete search history.

(56) References Cited

U.S. PATENT DOCUMENTS

| 4,049,396 A | 9/1977 | Hiles |
| 6,705,926 B2 | 3/2004 | Zhou |
| 6,984,588 B2 | 1/2006 | Grover |

(Continued)

FOREIGN PATENT DOCUMENTS

| CN | 1366547 A | 8/2002 |
| CN | 100425666 C | 10/2008 |

(Continued)

OTHER PUBLICATIONS

International Search Report and Written Opinion dated Dec. 9, 2020 with regard to International Application No. PCT/US2020/048221.

(Continued)

Primary Examiner — Roberts P Culbert
(74) Attorney, Agent, or Firm — Abel Schillinger, LLP; Adrian Lawrence

(57) ABSTRACT

A composition suitable for chemical mechanical polishing a substrate can comprise abrasive particles, a multi-valent metal borate, at least one oxidizer and a solvent. The composition can polish a substrate with a high material removal rate and a very smooth surface finish.

16 Claims, 2 Drawing Sheets

(56) References Cited

U.S. PATENT DOCUMENTS

| | | | |
|---|---|---|---|
| 7,077,880 B2 * | 7/2006 | Siddiqui | H01L 21/3212 106/3 |
| 7,513,920 B2 | 4/2009 | Siddiqui | |
| 8,304,344 B2 | 11/2012 | Boggs | |
| 9,238,753 B2 | 1/2016 | Reiss | |
| 10,418,248 B2 | 9/2019 | Petro | |
| 2004/0229461 A1 | 11/2004 | Darsillo | |
| 2006/0006074 A1 | 1/2006 | Liu | |
| 2006/0118760 A1 | 6/2006 | Yang | |
| 2007/0039926 A1 | 2/2007 | Cherian | |
| 2007/0218692 A1 | 9/2007 | Wolk | |
| 2008/0076688 A1 | 3/2008 | Barnes | |
| 2009/0311864 A1 | 12/2009 | Yamada | |
| 2010/0286014 A1 | 11/2010 | Barnes | |
| 2011/0059680 A1 | 3/2011 | Motonari | |
| 2011/0186542 A1 | 8/2011 | Li | |
| 2018/0340095 A1 | 11/2018 | Ward | |

FOREIGN PATENT DOCUMENTS

| | | |
|---|---|---|
| EP | 1118647 A1 | 7/2001 |
| TW | 200709293 A | 3/2007 |
| TW | 200736354 A | 10/2007 |
| TW | 201900837 A | 1/2019 |
| WO | 2004104122 A1 | 12/2004 |
| WO | 2009064365 A2 | 5/2009 |
| WO | 2018217978 A1 | 11/2018 |

OTHER PUBLICATIONS

International Search Report and Written Opinion dated Dec. 11, 2020 with regard to International Application No. PCT/US2020/048230.

\* cited by examiner

COMPOSITION AND METHOD FOR CONDUCTING A MATERIAL REMOVING OPERATION

CROSS-REFERENCE TO RELATED APPLICATION(S)

This application claims priority under 35 U.S.C. § 119(e) to U.S. Provisional Application No. 62/894,029, entitled "COMPOSITION AND METHOD FOR CONDUCTING A MATERIAL REMOVING OPERATION," by Lin F U et al., filed Aug. 30, 2019, which is assigned to the current assignee hereof and incorporated herein by reference in its entirety.

FIELD OF THE DISCLOSURE

The present disclosure relates to a composition for conducting a material removal operation, specifically a slurry composition including abrasive particles, a multi-valent metal borate, and an oxidizing agent, and a method of conducting the material removing operation.

BACKGROUND

Abrasive slurries have a large variety of applications, for example, for polishing of glass, ceramic, or metal materials, and are often designed for conducting a chemical mechanical planarization (CMP) process. In a typical CMP process, the relative movement of the slurry to a substrate to be polished assists with the planarization (polishing) process by chemically and mechanically interacting with the exterior surface of the substrate and removing unwanted material. Polishing is conducted until a desired smooth exterior surface with a low surface roughness is obtained. There exists a need of developing cost efficient abrasive slurries having a high material removal rate and leading to polished substrates having a low surface roughness.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
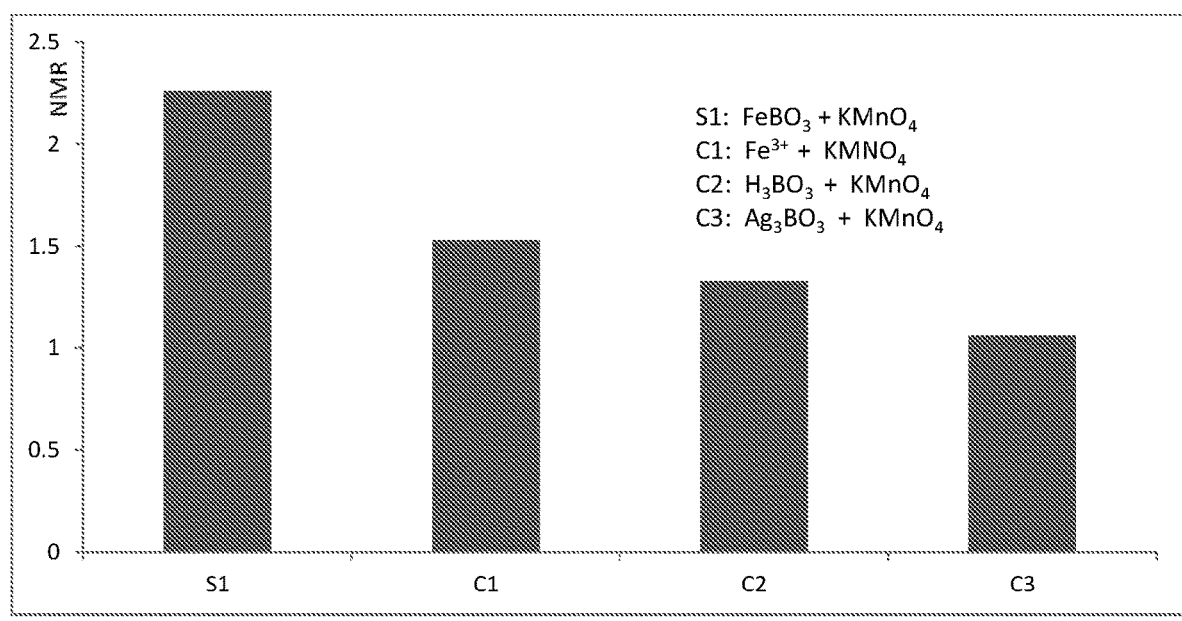
FIG. 1 includes a graph illustrating the normalized material removal (NMR) of a polishing composition including iron(III)borate according to one embodiment and the NMR of several comparative compositions.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a composition suitable for conducting a material removing operation. The composition comprises abrasive particles, a multi-valent metal borate, at least one oxidizing agent and a solvent. It has been surprisingly observed that the composition of the present disclosure can conduct polishing of a large variety of materials, including materials with a high hardness, such as silicon carbide or diamond, with at a high material removal rate and a desired low surface roughness.

As used herein, the term "multi-valent metal" relates to a metal containing cation having an oxidation state of +2 or more. As used herein, the term "multi-valent metal borate" is intended to mean a metal borate compound or complex that includes at least one multi-valent metal cation. It will be appreciated that certain multi-valent metal borate compounds include only one type of multi-valent metal cation.

For the purpose of calculating the concentrations of the multi-valent metal borate in the composition, it is assumed that neutral salts between the multi-valent metal ions and the borate ions are formed, for example, $FeBO_3$, or $AlBO_3$, or $Cu_3(BO_3)_2$.

In one embodiment, a multi-valent metal borate can include iron(III)borate, copper(II)borate, cobalt(II)borate, bismuth(III)borate, aluminum(III)borate, cerium(III)borate, chromium(III)borate, ruthenium(III)borate, titanium(III)borate, lead(II)borate, or any combination thereof. In a particular embodiment, the multi-valent metal borate may be iron(III)borate. As used herein, the term "iron(III)borate" is interchangeable used with the terms "iron borate" or "$Fe^{3+}$-borate" or $FeBO_3$.

In one embodiment, the composition of the present disclosure can be made by dissolving boric acid ($H_3BO_3$) and a multi-valent metal salt (e.g., a multi-valent metal nitrate, or chloride, or sulfate salt) in the solvent, adding and dissolving (at least partially) at least one oxidizing agent, adding the abrasive particles to form an abrasive particle dispersion, and adjusting the pH of the dispersion to a desired pH. Not being bound to theory, it is assumed that a multi-valent metal borate is formed between the multi-valent metal ion and the borate anion which can enhance the polishing efficiency if combined with an oxidizing agent.

In another aspect, the multi-valent metal borate can be formed by dissolving a borate salt having monovalent cations (e.g., sodium borate or potassium borate) together with a multi-valent metal salt (e.g., a multi-valent metal nitrate, or chloride, or sulfate). In another aspect, the multi-valent metal borate can be directly added and dispersed in the solvent.

In one aspect, the amount of multi-valent metal borate in the composition can be at least 0.01 wt % based on the total weight of the composition, or at least 0.025 wt %, or at least 0.05 wt %, or at least 0.1 wt %, or at least 0.5 wt %, or at least 1 wt %, or at least 2 wt %, or at least 3 wt %. In another aspect, the amount of the multi-valent metal borate may be not greater than 50 wt % based on the total weight of the composition, or not greater than 40 wt %, or not greater than 30 wt %, or not greater than 20 wt %, or not greater than 10 wt %, or not greater than 5 wt %, or not greater than 4 wt %, or not greater than 3 wt %, or not greater than 2 wt %, or not greater than 1 wt %, or not greater than 0.5 wt %, or not greater than 0.1 wt %. The amount of the multi-valent metal borate can be a value between any of the minimum and maximum values noted above, such as at least 0.025 wt % and not greater than 5 wt %, or at least 0.05 wt % and not greater than 1 wt %, or at least 0.05 wt % and not greater than 0.2 wt % based in the total weight of the composition.

In one non-limiting embodiment, the composition may have a molar ratio of total multi-valent metal-ions to total boron within a range of 1:20 to 20:1 (metal:boron), which means it may have either an excess of multi-valent metal ions or an excess of borate ions. In one embodiment, the molar ratio of total multi-valent metal-ions to total boron can be at least 1:18, or at least 1:15, or at least 1:12, or at least 1:10, or at least 1:9, or at least 1:8, or at least 1:7, or at least 1:6, or at least 1:5, or at least 1:4, or at least 1:3, or at least 1:2. In another embodiment, the ratio of total multi-valent metal-ions to total boron may be not greater than 18:1, or not greater than 15:1, or not greater than 12:1, or not greater than 10:1, or not greater than 9:1, or not greater than 8:1, or not greater than 7:1, or not greater than 6:1, or not greater than 5:1, or not greater than 4:1, or not greater than 3:1 or not greater than 2:1, or not greater than 1:1.

In one aspect, the molar ratio of total multi-valent metal ions to total boron can be used to calculate a molar ratio of total multi-valent metal ions to total borate ions, which can be within the same range as the ratios noted above for total multi-valent metal ions to total boron. For example, in one non-limiting embodiment, the ratio of total multi-valent metal ions to total borate ions may be within a range of 1:20 to 20:1. It will be understood that such a calculation may be based upon an assumption that all boron in the composition is in the form of borate ions.

In one embodiment, the oxidizing agent contained in the composition of the present disclosure can be a compound which dissolves in the solvent and has a suitable oxidation potential for chemically reacting with a surface of a substrate either alone or in combination with the multi-valent metal borate contained in the composition. It has been surprisingly observed that the efficiency of an oxidizing agent can be greatly enhanced if a multi-valent metal borate is further contained in an abrasive slurry composition. Not to be bound to theory, it is assumed that a synergistic effect is obtained by the multi-valent metal borate and the oxidizing agent when chemically altering the surface of a substrate material during polishing.

In one aspect, the oxidizing agent can have an oxidation potential of at least 0.26V, or at least 0.4V, or at least 0.5V, or at least 1.0V, or at least 1.5V. In another aspect, the oxidation potential may be not greater than 2.8V, or not greater than 2.5V, or not greater than 2.0V. As used herein, the oxidation potential is the value measured relative to the standard hydrogen electrode, at a temperature of 25° C., a pressure of 1 atm, at a concentration of 1 mol/L of the tested compound in water, and measured in Volt (V).

Non-limiting examples of oxidizing agents can be, for example, a peroxide, a permanganate, a peroxydisulfate, a chlorite, a perchlorate, a hypochlorite, an iodate, a periodate, a nitrite, a hyponitrite, a chromate, manganese oxide, or any combination thereof. In a particular embodiment, the oxidizing agent can be selected from potassium permanganate, hydrogen peroxide, potassium peroxydisulfate, or any combination thereof.

The amount of the oxidizing agent in the composition can be at least 0.01 wt % based on the total weight of the composition, or at least 0.05 wt %, or at least 0.1 wt %, or at least 0.05 wt %, or at least 1.0 wt %, or at least 1.5 wt %, or at least 2 wt %, or at least 3 wt %. In another aspect, the amount of oxidizing agent can be not greater than 40 wt %, such as not greater than 30 wt %, not greater than 20 wt %, not greater than 10 wt %, not greater than 7 wt %, not greater than 5 wt %, not greater than 3 wt %, not greater than 2 wt %, not greater than 1 wt %, or not greater than 0.5 wt % based on the total weight of the composition. The amount of the oxidizing agent can be a value between any of the minimum and maximum values noted above, such as at least 0.01 wt % and not greater than 10 wt %, or at least 1 wt % and not greater than 5 wt % based on the total weight of the composition.

In a particular embodiment, the solvent of the composition of the present disclosure can be water, but is not limited thereto. In other aspects, the solvent can be a mixture of water and one or more other polar and/or unpolar solvents.

The abrasive particles contained in the composition of the present disclosure are not limited to a specific material type and can include, for example, zirconia, alumina, silica, diamond, cubic boron nitride, ceria, iron oxide, titanium oxide, manganese oxide, lanthanium oxide, or any combination thereof. In a particular aspect, the abrasive particles can be selected from alumina, zirconia, ceria, silica, diamond, or iron oxide. In one certain aspect, the abrasive particles can be alumina. In another certain aspect, the abrasive particles can be zirconia.

The average size (D50) of the abrasive particles can be at least 10 nm, or at least 25 nm, or at least 50 nm, at least 80 nm, at least 100 nm, at least 130 nm, or at least 150 nm, at least at least 180 nm, or at least 200 nm, or at least 250 nm. In another embodiment, the average particle size may be not greater than 50 microns, such as not greater than 20 microns, not greater than 10 microns, not greater than 5 microns, not greater than 1 micron, not greater than 0.8 microns, not greater than 0.5 microns, or not greater than 0.3 microns. The average particle size of the abrasive particles can be a value between any of the minimum and maximum values noted above, for example, at least 50 nm and not greater than 500 nm, at least 70 nm and not greater than 250 nm, or at least 80 nm and not greater than 200 nm.

In one embodiment, the amount of the abrasive particles contained in the composition can be at least 0.01 wt % based on a total weight of the composition, or at least 0.05 wt %, or at least 0.1 wt %, or at least 0.5 wt %, or at least 1 wt %, or at least 2 wt %, or at least 3 wt %, or at least 4 wt %, or at least 5 wt %. In another embodiment, the amount of the abrasive particles can be not greater than 50 wt %, such as not greater than 40 wt %, or not greater than 30 wt %, or not greater than 20 wt %, or not greater than 15 wt %, or not greater than 10 wt %, or not greater than 8 wt %, or not greater than 5 wt %. The amount of abrasive particles can be a value between any of the minimum and maximum values noted above. In a particular aspect, the amount of abrasive particles can be at least 0.1 wt % and not greater than 5 wt %.

In embodiments, the composition can further comprise one or more optional additives, for example a surfactant, or a dispersant, or a chelating agent, a pH buffer, a rheology modifier, a corrosion resistant agent, or any combination thereof.

In a certain embodiment, the composition of the present disclosure can consist essentially of abrasive particles, iron borate, a permanganate salt, and water.

The pH of the composition can be within a range of at least 1 and not greater than 9. In certain aspects, the pH can be at least 1.3, or at least 1.5, or at least 1.7, or at least 1.9, or at least 2.0. In other aspects, the pH of the composition may be not greater than 8.5, such as not greater than 8, or not greater than 7, or not greater than 5, or not greater than 4, or not greater than 3.5, or not greater than 3.0, or not greater than 2.5, or not greater than 2.3. The pH of the composition can be a value between any of the minimum and maximum values noted above, such as at least 1 and not greater than 9, at least 1.5 and not greater than 5, or at least 1.8 and not greater than 2.5.

The present disclosure is further directed to a method of polishing a substrate. The method can comprise: providing the polishing composition of the present disclosure described above, bringing the polishing composition in direct contact with the substrate; and polishing the substrate surface. In one aspect, the substrate can be polished with a polishing pad, wherein the polishing pad and the substrate are moving relative to one another and the polishing composition is in contact with the substrate and the polishing pad.

In one embodiment, the temperature of the polishing composition during polishing can be at least 40° C., or at least 45° C., or at least 50° C., or at least 55° C., or at least 60° C., or at least 65° C. In another embodiment, the temperature of the composition during polishing may be not greater than 90° C., or not greater than 85° C., or not greater than 80° C., or not greater than 75° C., or not greater than 70° C. The temperature of the composition during polishing can be a value in a range between any of the minimum and maximum values noted above.

It has been surprisingly discovered that the composition of the present disclosure can be suitable as a chemical mechanical polishing composition having a high polishing efficiency of a substrate and leading to a smooth exterior surface of the polished substrate with a low surface roughness.

In one embodiment the substrate to be polished can include a ceramic material, a metal, a metal alloy, diamond, or a polymer. In a particular embodiment, the substrate can be a group III-V compound, for example, gallium nitride. In another particular embodiment, the substrate can be a group IV-IV compound, for example, silicon carbide. Non-limiting examples of a polymer can be a polyacrylate, a polymethacrylate, a polyimide, a polyolefine, a polyacrylamide, a polyester, a polyurethane, or any combinations, such as co-polymers or cross-polymers thereof, as used, e.g., in a photo-resist.

In a particular aspect, the composition and method of the present disclosure can be adapted for polishing a silicon carbide substrate with a normalized removal rate of at least 1.5 and a surface roughness of not greater than 2.0 Å. As used herein, the normalized material removal rate is the ratio of the actual removal rate of the slurry to the removal rate of a baseline slurry, wherein the baseline slurry contains 1 wt % alpha alumina particles with an average particle size of 100 nm, 4 wt % $KMnO_4$, 95 wt % distilled water, and is adjusted to the same pH as the slurry to be tested. In a particular embodiment, the normalized material removal rate of polishing a silicon carbide substrate can be at least 1.6, at least 1.7, at least 1.8, at least 1.9, at least 2.0, at least 2.1, at least 2.2, or at least 2.3. In another aspect, the surface roughness of the silicon carbide substrate after polishing can be not greater than 1.9 Å, or not greater than 1.8 Å, or not greater than 1.7 Å, or not greater than 1.6 Å, or not greater than 1.5 Å.

In another embodiment, the present disclosure is directed to a kit adapted to preparing a composition for chemical mechanical polishing, and a method of polishing a substrate using the kit. The kit can comprise a first package and a second package (herein also called "two-package kit"), wherein the first package may comprise a multi-valent metal salt, and the second package may comprise boric acid. It has been surprisingly observed that a polishing composition prepared by the two-package kit can have over a longer time period a desired polishing efficiency than a composition which contains all ingredients in one package. Not being bound to theory, it is assumed that forming the multi-valent metal borate in-situ, short before conducting a polishing operation, may have an advantage.

In one aspect, the shelf-life of the two-package kit can be at least 70 days, such as at least 80 days, at least 100 days, at least 150 days, at least 200 days, or at least 365 days. As used herein, the shelf-life of the kit is defined as the amount of days that the two-package kit is stored at room temperature, wherein a composition prepared by combining the first package and the second package of the kit has a decline in the polishing efficiency of polishing a silicon carbide substrate of at least 16% in comparison to the polishing efficiency of a corresponding composition prepared from the two-package kit with the shelf life of one day.

The kit, after combining the first package and the second package, can correspond to the same composition as described above for polishing a substrate, having the same properties and features. In one aspect, the abrasive particles can be contained in the first package or the second package of the kit. In yet another aspect, the at least one oxidizing agent can be contained in the first package or the second package of the kit. In a particular aspect, the abrasive particles and the at least one oxidizing agent may be contained together with the boric acid and solvent in the first package, while the second package can contain the multi-valent metal salt and solvent.

As further demonstrated in the Examples below, the present disclosure provides compositions suitable as abrasive slurries for polishing a substrate, and particularly for chemical mechanical polishing a substrate.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A composition comprising: abrasive particles; a multi-valent metal borate; at least one oxidizing agent; and a solvent.

Embodiment 2. The composition of Embodiment 1, wherein the multi-valent metal borate includes iron(III) borate, copper(II)borate, cobalt(II)borate, bismuth(III)borate, aluminum(III)borate, cerium(III)borate, chromium(III) borate, ruthenium(III)borate, titanium(III)borate, lead(II) borate, or any combination thereof.

Embodiment 3. The composition of Embodiment 2, wherein the multi-valent metal borate includes iron(III) borate, copper(II)borate, cobalt(II)borate, bismuth(III)borate, aluminum(III)borate, cerium(III)borate, or any combination thereof.

Embodiment 4. The composition of Embodiment 3, wherein the multi-valent metal borate consists essentially of iron(III)borate.

Embodiment 5. The composition of any of the preceding Embodiments, wherein the composition comprises a molar ratio of total multi-valent metal-ions to total boron within a range of 1:20 to 20:1.

Embodiment 6. The composition of Embodiment 5, wherein the molar ratio of total multi-valent metal-ions to total boron is at least 1:18, or at least 1:15, or at least 1:12, or at least 1:10, or at least 1:9, or at least 1:8, or at least 1:7, or at least 1:6, or at least 1:5, or at least 1:4, or at least 1:3, or at least 1:2.

Embodiment 7. The composition of Embodiment 5, wherein the molar ratio of total multi-valent metal-ions to total boron is within a range of not greater than 18:1, or not greater than 15:1, or not greater than 12:1, or not greater than 10:1, or not greater than 9:1, or not greater than 8:1, or not greater than 7:1, or not greater than 6:1, or not greater than 5:1, or not greater than 4:1, or not greater than 3:1 or not greater than 2:1, or not greater than 1:1.

Embodiment 8. The composition of any of the preceding Embodiments, wherein an oxidation potential of the at least one oxidizing agent is at least 0.26 V, or at least 0.4 V, or at least 0.5 V, or at least 1.0 V, or at least 1.5 V.

Embodiment 9. The composition of any of the preceding Embodiments, wherein an oxidation potential of the at least one oxidizing agent is not greater than 2.8 V.

Embodiment 10. The composition of any of the preceding Embodiments, wherein the at least one oxidizing agent includes a peroxide, a permanganate, a peroxydisulfate, a chlorite, a perchlorate, a hypochlorite, a nitrite, a hyponitrite, an iodate, a periodate, a chromate, manganese oxide, or any combination thereof.

Embodiment 11. The composition of Embodiment 10, wherein the oxidizing agent consists essentially of a permanganate.

Embodiment 12. The composition of Embodiment 11, wherein the permanganate is potassium permanganate.

Embodiment 13. The composition of any of the preceding Embodiments, wherein an amount of the multi-valent metal borate is at least 0.01 wt %, or at least 0.025 wt %, or at least 0.05 wt % or at least 0.1 wt % or at least 0.5 wt % or at least 1 wt %, or at least 2 wt %, or at least 3 wt % based on the total weight of the composition.

Embodiment 14. The composition of any of the preceding Embodiments, wherein an amount of the multi-valent metal borate is not greater than 50 wt %, or not greater than 40 wt %, or not greater than 30 wt %, or not greater than 20 wt %, or not greater than 10 wt %, or not greater than 5 wt %, or not greater than 4 wt %, or not greater than 3 wt %, or not greater than 2 wt %, or not greater than 1 wt %, or not greater than 0.5 wt %, or not greater than 0.1 wt % based on the total weight of the composition.

Embodiment 15. The composition of Embodiments 13 or 14, wherein an amount of the multi-valent metal borate is at least 0.01 wt % and not greater than 5 wt %, or at least 0.03 wt % and not greater than 1 wt %, or at least 0.05 wt % and not greater than 0.2 wt % based in the total weight of the composition.

Embodiment 16. The composition of any of the preceding Embodiments, wherein an amount of the at least one oxidizing agent is at least 0.01 wt % based on the total weight of the composition, or at least 0.05 wt %, or at least 0.1 wt %, or at least 0.05 wt %, or at least 1.0 wt %, or at least 1.5 wt %, or at least 2 wt %, or at least 3 wt %.

Embodiment 17. The composition of any of the preceding Embodiments, wherein an amount of the at least one oxidizing agent is not greater than 40 wt %, such as not greater than 30 wt %, not greater than 20 wt %, not greater than 10 wt %, not greater than 7 wt %, not greater than 5 wt %, not greater than 3 wt %, not greater than 2 wt %, not greater than 1 wt %, or not greater than 0.5 wt % based on the total weight of the composition.

Embodiment 18. The composition of Embodiments 16 or 17, wherein the amount of the at least one oxidizing agent is at least 0.01 wt % and not greater than 10 wt %, or at least 1 wt % and not greater than 5 wt % based on the total weight of the composition.

Embodiment 19. The composition of any of the preceding Embodiments, wherein the solvent includes water.

Embodiment 20. The composition of any of the preceding Embodiments, wherein the abrasive particles include zirconia, alumina, silica, diamond, cubic boron nitride, ceria, iron oxide, titanium oxide, manganese oxide, lanthanium oxide, or any combination thereof.

Embodiment 21. The composition of Embodiment 20, wherein the abrasive particles include alumina, zirconia, ceria, silica, diamond, or iron oxide.

Embodiment 22. The composition of Embodiment 21, wherein the abrasive particles include zirconia.

Embodiment 23. The composition of Embodiment 21, wherein the abrasive particles include alumina.

Embodiment 24. The composition of any of the preceding Embodiments, wherein an average (D50) particle size of the abrasive particles is at least 25 nm, or at least 50 nm, at least 80 nm, at least 100 nm, at least 150 nm, at least 200 nm, or at least 250 nm.

Embodiment 25. The composition of any of the preceding Embodiments, wherein an average (D50) particle size of the abrasive particles is not greater than 50 microns, such as not greater than 20 microns, not greater than 10 microns, not greater than 5 microns, not greater than 1 micron, not greater than 0.8 microns, not greater than 0.5 microns, or not greater than 0.3 microns.

Embodiment 26. The composition of any of the preceding Embodiments, wherein an average (D50) particle size of the abrasive particles is at least 50 nm and not greater than 250 nm.

Embodiment 27. The composition of any of the preceding Embodiments, wherein an amount of the abrasive particles is at least 0.01 wt % based on a total weight of the composition, at least 0.05 wt %, or at least 0.1 wt %, or at least 0.5 wt %, or at least 1 wt %, or at least 2 wt %, or at least 3 wt %, or at least 4 wt %, or at least 5 wt %.

Embodiment 28. The composition of any of the preceding Embodiments, wherein an amount of the abrasive particles is not greater than 50 wt %, such as not greater than 40 wt %, not greater than 30 wt %, not greater than 20 wt %, not greater than 15 wt %, not greater than 10 wt %, not greater than 8 wt %, or not greater than 5 wt %.

Embodiment 29. The composition of any of the preceding Embodiments, wherein an amount of the abrasive particles is at least 0.1 wt % and not greater than 5 wt %.

Embodiment 30. The composition of any of the preceding Embodiments, wherein a pH of the composition is at least 1 and not greater than 9, or at least 1.5 and not greater than 5, or at least 1.8 and not greater than 2.5.

Embodiment 31. The composition of any of the preceding Embodiments, wherein a pH is at least 1.3, at least 1.5, at least 1.7, at least 1.9, at least 2.0, at least 2.1, at least 2.2, at least 2.3, at least 2.4, or at least 2.5.

Embodiment 32. The composition of any of the preceding Embodiments, wherein a pH is not greater than 4, or not greater than 3.8, or not greater than 3.5, or not greater than 3.2, or not greater than 3.0, or not greater than 2.8, or not greater than 2.5, or not greater than 2.3.

Embodiment 33. The composition of any of the preceding Embodiments, wherein the composition is adapted for chemical mechanical polishing of a substrate.

Embodiment 34. The composition of Embodiment 33, wherein the substrate includes a ceramic material, a metal, a metal alloy, diamond, or a polymer.

Embodiment 35. The composition of Embodiment 34, wherein the ceramic material includes a group III-V compound or a group IV-IV compound.

Embodiment 36. The composition of Embodiment 35, wherein the ceramic material includes gallium nitride or silicon carbide.

Embodiment 37. The composition of any of the preceding Embodiments, wherein the composition further comprises a surfactant, or a dispersant, or a chelating agent, or a pH buffer, or a rheology modifier, or a corrosion resistant agent, or any combination thereof.

Embodiment 38. The composition of any of the preceding Embodiments, consisting essentially of the abrasive particles, iron borate, a permanganate salt, and water.

Embodiment 39. The composition of any of the preceding Embodiments, wherein the composition is adapted for polishing a silicon carbide substrate with normalized removal rate of at least 1.5 and a surface roughness of not greater than 2.0 Å.

Embodiment 40. The composition of Embodiment 39, wherein the normalized removal rate is at least 1.6, at least 1.7, at least 1.8, at least 1.9, at least 2.0, at least 2.1, at least 2.2, or at least 2.3.

Embodiment 41. The composition of Embodiment 39, wherein the surface roughness after polishing the silicon carbide substrate is not greater than 1.9 Å, or not greater than 1.8 Å, or not greater than 1.7 Å, or not greater than 1.6 Å, or not greater than 1.5 Å.

Embodiment 42. A method of polishing a substrate, comprising: providing a polishing composition, wherein the polishing composition comprises abrasive particles, a multi-valent metal borate, at least one oxidizing agent and water; bringing the polishing composition in contact with the substrate; and polishing the substrate.

Embodiment 43. The method of Embodiment 42, wherein the substrate includes a ceramic material, a metal, a metal alloy, diamond, or a polymer, a group III-V compound, or a IV-IV compound.

Embodiment 44. The method of Embodiment 43, wherein the substrate is silicon carbide or gallium nitride.

Embodiment 45. The method of Embodiment 42, further including adjusting the polishing composition before polishing to a pH of at least 1 and not greater than 9.

Embodiment 46. The method of Embodiment 45, wherein the pH is adjusted to a pH of at least 1 and not greater than 5.

Embodiment 47. The method of Embodiment 46, wherein the pH is at least 1.3, at least 1.5, at least 1.7, at least 1.9, at least 2.0, at least 2.1, at least 2.2, at least 2.3, at least 2.4, or at least 2.5.

Embodiment 48. The method of Embodiment 46, wherein the pH is not greater than 4, or not greater than 3.8, or not greater than 3.5, or not greater than 3.2, or not greater than 3.0, or not greater than 2.8, or not greater than 2.5, or not greater than 2.3.

Embodiment 49. The method of any of Embodiments 42-48, wherein polishing is conducted at a normalized removal rate of the substrate of at least 2.0.

Embodiment 50. The method of any of Embodiments 42-49, wherein a surface roughness of the substrate after polishing is not greater than 2 Å.

Embodiment 51. The method of any of Embodiments 42-50, wherein the abrasive particles include zirconia, alumina, silica, diamond, cubic boron nitride, ceria, iron oxide, titanium oxide, manganese oxide, lanthanium oxide, or any combination thereof.

Embodiment 52. The method of Embodiment 51, wherein the abrasive particles include alumina, zirconia, ceria, silica, diamond, or iron oxide.

Embodiment 53. The method of any of Embodiments 42-52, wherein an oxidation potential of the at least one oxidizer is at least 0.26 V, or at least 0.4 V, or at least 0.5 V, or at least 1.0 V, or at least 1.5 V.

Embodiment 54. The method of any of Embodiments 42-53, wherein the oxidation potential of the oxidizer is not greater than 2.8 V.

Embodiment 55. The method of any of Embodiments 42-54, wherein the at least one oxidizing agent includes a peroxide, a persulfate, a permanganate, chlorite, a nitrite, a perchlorate, a hypochlorite, manganese oxide, or any combination thereof.

Embodiment 56. The method of Embodiment 55, wherein the oxidizing agent consists essentially of a permanganate.

Embodiment 57. The method of Embodiment 56, wherein the permanganate is potassium permanganate.

Embodiment 58. The method of any of Embodiments 42-57, wherein an amount of the multi-valent metal borate is at least 0.01 wt % and not greater than 5 wt %, or at least 0.05 wt % and not greater than 1 wt %, or at least 0.05 wt % and not greater than 0.3 wt % based in the total weight of the composition.

Embodiment 59. The method of any of Embodiments 42-58, wherein the amount of the oxidizing agent is at least 0.01 wt % and not greater than 10 wt %, or at least 0.5 wt % and not greater than 5 wt % based on the total weight of the composition.

Embodiment 60. The method of any of Embodiments 42-59, wherein the solvent includes water.

Embodiment 61. The method of any of Embodiments 42-60, wherein a pH of the composition is at least 1 and not greater than 9, or at least 1.5 and not greater than 5, or at least 1.8 and not greater than 2.5.

Embodiment 62. The method of any of Embodiments 42-61, wherein the pH is at least 1.3, at least 1.5, at least 1.7, at least 1.9, at least 2.0, at least 2.1, at least 2.2, at least 2.3, at least 2.4, or at least 2.5.

Embodiment 63. The method of any of Embodiments 42-62, wherein the pH is not greater than 4, or not greater than 3.8, or not greater than 3.5, or not greater than 3.2, or not greater than 3.0, or not greater than 2.8, or not greater than 2.5, or not greater than 2.3.

Embodiment 64. A kit adapted to preparing a composition for chemical mechanical polishing, the kit comprising a first package and a second package, wherein the first package comprises a multi-valent metal salt, and the second package comprises boric acid.

Embodiment 65. The kit of Embodiment 64, wherein the kit is adapted that after combining package 1 and package 2 a multi-valent metal borate is formed in-situ.

Embodiment 66. The kit of Embodiments 64 or 65, wherein the first package or the second package further comprises abrasive particles.

Embodiment 67. The kit of any one of Embodiments 64-66, wherein the first package or the second package further comprises at least one oxidizing agent.

Embodiment 68. The kit of Embodiment 64, wherein the second package further comprises abrasive particles and at least one oxidizing agent.

Embodiment 69. The kit of any one of Embodiments 64-67, wherein the multi-valent metal ion of the multi-valent metal salt includes $Fe^{3+}$, $Fe^{2+}$, $Co^{2+}$, $Ce^{3+}$, $Bi^{3+}$, $Al^{3+}$, $Ru^{3+}$, $Ti^{3+}$, $Pb^{2+}$, or any combination thereof.

Embodiment 70. The kit of Embodiment 69, wherein the multi-valent metal ion includes $Fe^{3+}$ or $Cu^{2+}$.

Embodiment 71. The kit of Embodiment 70, wherein the multi-valent metal ion consists essentially of $Fe^{3+}$.

Embodiment 72. The kit of any one of Embodiments 64-71, wherein the first package is essentially free of boron.

Embodiment 73. The kit of any one of Embodiments 64-72, wherein an anion of the multi-valent metal salt includes nitrate, chloride, bromide, iodide, sulfate, phosphate or any combination thereof.

Embodiment 74. The kit of any one of Embodiments 64-73, wherein the at least one oxidizing agent includes a permanganate, a peroxydisulfate, a chlorite, a perchlorate, a hypochlorite, a nitrite, a hyponitrite, an iodate, a periodate, a chromate, a peroxide, manganese oxide, or any combination thereof.

Embodiment 75. The kit of Embodiment 74, wherein the at least one oxidizing agent includes a permanganate salt.

Embodiment 76. The kit of Embodiment 75, wherein the at least one oxidizing agent includes potassium permanganate.

Embodiment 77. The kit of any one of Embodiments 66-76, wherein the abrasive particles include alumina particles, zirconia particles, or a combination thereof.

Embodiment 78. The kit of any one of Embodiments 64-77, wherein the kit has a shelf-life of at least 70 days, the shelf-life corresponding to the amount of days that a composition prepared from the kit by combining the first package and the second package has a decline in polishing efficiency of at least 16% in comparison to a polishing efficiency of the composition after one day of preparing the kit.

Embodiment 79. The kit of Embodiment 78, wherein the shelf-life of the kit is at least 80 days, or at least 100 days, or at least 150 days, or at least 200 days, or at least 365 days.

Embodiment 80. A method of polishing a substrate, comprising: preparing a polishing composition, wherein preparing the polishing composition comprises combining a first package and a second package, the first package and the second package being parts of a kit, wherein the first package comprises a multi-valent metal salt and the second package comprises boric acid; bringing the polishing composition in contact with the substrate; and polishing the substrate.

Embodiment 81. The method of Embodiment 80, wherein combining the first package and the second packages comprises in-situ forming of a multi-valent metal borate.

Embodiment 82. The method of Embodiments 80 or 81, wherein preparing the polishing composition is conducted on the same day as the polishing of the substrate.

Embodiment 83. The method of any one of Embodiments 80-82, wherein the first package or the second package further comprises abrasive particles.

Embodiment 84. The method of Embodiment 83, wherein the abrasive particles include alumina particles or zirconia particles.

Embodiment 85. The method of any one of Embodiments 80-84, wherein the first package or the second package further comprises at least one oxidizing agent.

Embodiment 86. The method of Embodiment 80, wherein the second package further comprises abrasive particles and at least one oxidizing agent.

Embodiment 87. The method of any one of Embodiments 80-85, wherein the multi-valent metal ion of the multi-valent metal salt includes $Fe^{3+}$, $Fe^{2+}$, $Co^{2+}$, $Ce^{3+}$, $Bi^{3+}$, $Al^{3+}$, $Ru^{3+}$, $Ti^{3+}$, $Pb^{2+}$, or any combination thereof.

Embodiment 88. The method of Embodiment 87, wherein the multi-valent metal ion includes $Fe^{3+}$ or $Cu^{2+}$.

Embodiment 89. The method of Embodiment 88, wherein the multi-valent metal ion consists essentially of $Fe^{3+}$.

Embodiment 90. The method of any one of Embodiments 80-89, wherein the first package is essentially free of boron.

Embodiment 91. The method of any one of Embodiments 80-90, wherein an anion of the multi-valent metal salt includes nitrate, chloride, bromide, iodide, phosphate, sulfate, or any combination thereof.

Embodiment 92. The method of any one of Embodiments 80-91, further including any one of the features of Embodiments 46-63.

EXAMPLES

The following non-limiting examples illustrate the present invention.

Example 1

An aqueous abrasive slurry composition (S1) was prepared by adding to 945 ml distilled water under stirring 2.5 g (6.19 mmol) iron(III)nitrate nonahydrate ($Fe(NO_3)_3$ $9H_2O$), 2.5 g (40.3 mmol) boric acid ($H_3BO_3$), 40.0 g (253.2 mmol) potassium permanganate ($KMnO_4$) and 10 g alpha alumina particles having a mean (D50) particle size of 100 nm from Saint-Gobain. After combining all ingredients, the pH of the slurry was adjusted with 1N $HNO_3$ to a pH of 2.1. According to the molar amounts of the added ingredients, the molar ratio of total $Fe^{3+}$ ions to total borate ions ($BO_3^{3-}$) was 1:6.5.

Furthermore, slurries were prepared the same way as slurry S1, but using different types of multi-valent metal nitrates in order to form the following multi-valent metal borates: $Al^{3+}$-borate (slurry S2); $Cu^{2+}$-borate (slurry S3); $Bi^{3+}$-borate (slurry S4); $Co^{2+}$-borate(slurry S5); $Ce^{3+}$-borate (slurry S6); $Ni^{2+}$-borate (slurry C7) and $Ag^+$-borate(comparative slurry C3).

The polishing properties of the slurries were tested and compared by polishing a silicon carbide substrate using a Strasbaugh 6EC Polishing Tool. The silicon carbide substrate was a 4H-type round wafer with a diameter of 150 mm.

A summary of the tested slurry compositions and the test results, such as the normalized material removal rate and surface roughness after polishing, can be seen in Table 1.

TABLE 1

| Slurry No. | Abrasive particles | Metal-Ions | Metal-Ions [mmol/kg] | $H_3BO_3$ [mmol/kg] | $KMnO_4$ mmol/kg | pH | NMR | Surface Roughness [Å] |
|---|---|---|---|---|---|---|---|---|
| S1 | alumina | $Fe^{3+}$ | 6.19 | 40.3 | 253.2 | 2.1 | 2.26 | 1.6 |
| S2 | alumina | $Al^{3+}$ | 6.19 | 40.3 | 253.2 | 2.1 | 1.70 | 1.5 |

TABLE 1-continued

| Slurry No. | Abrasive particles | Metal-Ions | Metal-Ions [mmol/kg] | $H_3BO_3$ [mmol/kg] | $KMnO_4$ mmol/kg | pH | NMR | Surface Roughness [Å] |
|---|---|---|---|---|---|---|---|---|
| S3 | alumina | $Cu^{2+}$ | 6.19 | 40.3 | 253.2 | 2.1 | 1.72 | 1.6 |
| S4 | alumina | $Bi^{3+}$ | 6.19 | 40.3 | 253.2 | 2.1 | 1.82 | 1.5 |
| S5 | alumina | $Co^{2+}$ | 6.19 | 40.3 | 253.2 | 2.1 | 1.57 | 1.5 |
| S6 | alumina | $Ce^{3+}$ | 6.19 | 40.3 | 253.2 | 2.1 | 1.40 | 1.4 |
| S7 | alumina | $Ni^{2+}$ | 6.19 | 40.3 | 253.2 | 2.1 | 0.98 | 1.4 |
| C1 | alumina | $Fe^{3+}$ | 6.19 | — | 253.2 | 2.1 | 1.53 | 1.6 |
| C2 | alumina | $Fe^{3+}$ | — | 40.3– | 253.2 | 2.1 | 1.33 | 1.5 |
| C3 | alumina | $Ag^+$ | 6.19 | 40.3 | 253.2 | 2.1 | 1.06 | 1.5 |

The polishing test results for the different slurry compositions summarized in Table 1 show that the highest normalized removal rate (NMR) was obtained for slurry S1, which contained the combination of alumina particles, iron borate, $KMnO_4$ and water.

It can be further seen that with other multi-valent metal borates, such as $Al^{3+}$ borate, $Cu^{2+}$ borate, $Bi^{3+}$ borate, $Co^{2+}$ borate, and $Ce^{3+}$ borate, although the normalized material removal rate was lower than the NMR of the iron borate containing slurry S1, the NMR was still at least 40% higher than the removal rate of the corresponding base line slurry (containing 1 wt % alumina, 4 wt % $KMnO_4$, 95 wt % water, pH 2.1).

As also illustrated in FIG. 1, comparative slurries C1 and C2 demonstrate that the presence of only $Fe^{3+}$-ions and no borate ions (comparative slurry C1) and of only borate ions and no $Fe^{3+}$-ions (comparative slurry C2) resulted in a much lower NMR as obtained with slurry S1 including iron borate. Not to be bound to theory, these comparisons indicate the synergistic effect of iron borate with the oxidizing agent as a major reason for the high NMR, while slurries containing oxidizer with boric acid alone (C2) or oxidizer and $Fe^{3+}$-ions alone (C1) were much lower in the material removal rate. In addition, sample S1 also contributed to an excellent surface finish.

A comparative slurry including Ag+ borate (see comparative slurry C3), as an example of a mono-valent metal borate, had a NMR which was about the same as the removal rate of the baseline slurry and did not provide an advantage regarding the removal rate during polishing, see also FIG. 1.

The normalized removal rate (NMR) was calculated as the ratio between that actual material removal rate of the tested slurry and the removal rate of a corresponding baseline slurry, also called herein baseline removal rate. The baseline removal rate was measured with a standard slurry containing 1 wt % alpha alumina particles with an average size of 100 nm from Saint-Gobain, 4 wt %, $KMnO_4$, and 95 wt % distilled water, adjusted to pH=2.1. When measuring the baseline removal rate, the same polishing conditions were used as for the slurry of interest.

Example 2

In Example 2, a slurry composition was prepared and tested including as abrasive particles 1 wt % zirconia with an average particle size of 100 nm from Saint-Gobain. Except to the change of the type of abrasive particles, the slurry containing zirconia abrasive particles (S8) contained the same ingredients and was prepared the same way as slurry S1 of Example 1.

As summarized in Table 2, it can be seen that slurry S8, which included zirconia particles, iron borate and $KMnO_4$, had an even higher NMR than slurry S1, which contained alumina particles instead of zirconia particles.

Comparative slurry composition C4, which contained only zirconia particles and oxidizer $KMnO_4$, lead to a NMR which was similar as the baseline slurry containing alumina particles.

The high NMR of 2.61 with slurry S8 versus a NMR 0.97 of the comparative slurry not including a multi-valent metal borate, demonstrates again the surprising effect of the combination of iron borate and oxidizing agent with regard to the polishing efficiency. The experiments further show that the type of abrasive particles contained in the slurry appears to have a rather minor influence on the NMR in comparison to the effect of the presence of the iron borate.

TABLE 2

| Slurry No. | Abrasive particles | Metal-Ions | Metal-Ions [mmol/kg] | $H_3BO_3$ [mmol/kg] | KMnO4 [mmol/kg] | pH | Normalized removal rate (NMR) | Surface Roughness [Å] |
|---|---|---|---|---|---|---|---|---|
| S8 | zirconia | $Fe^{3+}$ | 6.19 | 40.3 | 253.2 | 2.1 | 2.61 | 1.3 |
| S1 | alumina | $Fe^{3+}$ | 6.19 | 40.3 | 253.2 | 2.1 | 2.26 | 1.6 |
| C4 | zirconia | — | — | — | 253.2 | 2.1 | 0.97 | 1.3 |

Example 3

In Example 3, iron borate containing slurries were investigated with regard to varying the amount of alumina particles.

As summarized in Table 3 below, doubling the amount of alumina from 1 wt % (slurry S1) to 2 wt % (slurry S9) resulted in an increase of the NMR of 0.28.

TABLE 3

| Slurry No. | Abrasive particles | Me-Ions | Me-Ion [mmol/kg] | Borate [mmol/kg] | Oxidizer | pH | Normalized removal rate (NMR) | Surface Roughness [Å] |
|---|---|---|---|---|---|---|---|---|
| S1 | 1 wt % alumina | $Fe^{3+}$ | 6.19 | 40.3 | $KMnO_4$ | 2.1 | 2.26 | 1.6 |
| S9 | 2 wt % alumina | $Fe^{3+}$ | 6.19 | 40.3 | $KMnO_4$ | 2.1 | 2.54 | 1.6 |

Example 4

In Example 4, the NMR of a slurry containing two oxidizing agents (S10) was compared with slurry S1, which contained only one oxidizing agent. The only difference between the two slurries was the additional oxidizing agent.

As shown in Table 4 below, adding in addition to the $KMnO_4$ as a second oxidizing agent potassium peroxydisulfate ($K_2S_2O_8$) in an amount of 9.26 mmol/kg, resulted in a minor increase of the NMR by 0.22.

TABLE 4

| Slurry No. | Abrasive particles | Me-Ions | Me-Ion [mmol/kg] | Borate [mmol/kg] | Oxidizer | pH | Normalized removal rate (NMR) | Surface Roughness [Å] |
|---|---|---|---|---|---|---|---|---|
| S1 | 1 wt % alumina | $Fe^{3+}$ | 6.19 | 40.3 | $KMnO_4$ | 2.1 | 2.26 | 1.6 |
| S10 | 1 wt % alumina | $Fe^{3+}$ | 6.19 | 40.3 | $KMnO_4$ + $K_2S_2O_8$ | 2.1 | 2.48 | 1.6 |

Example 5

Slurry compositions with varying concentrations of iron borate and oxidizer KMnO4 were compared to investigate the influence on the NMR of silicon carbide. All NMR testing was conducted the same way as in Example 1, and also included the same baseline slurry (1 wt % alpha alumina particles, 4 wt % $KMnO_4$, 95 wt % water and a pH of 2.1).

The measured NMR of the slurries and the obtained surface roughness of the silicon carbide substrate after the polishing is summarized in Table 5.

In slurry S11, the amount of iron borate and the amount of oxidizing agent was reduced to half the amount compared to slurry S1 of Example 1, which resulted in a decrease of the NMR from 2.26 (sample S1) to 1.75 (sample S11). It was highly surprising to observe in this experiment that a relatively large reduction in the amount of oxidizer (4 wt % to 2 wt %) reduced the NMR only from 2.26 to 1.75, and resulted in a very minor change of the final surface roughness. This demonstrates again the synergistic effect of iron borate and oxidizer during the polishing, wherein an amount of only 0.04 wt % iron borate (3.4 mmol/kg $FeBO_3$) together with about 2 wt % $KMnO_4$ (126.6 mmol/kg) was capable of increasing the removal rate by 75% in comparison to the baseline slurry, wherein the baseline slurry contained twice the amount of the oxidizer $MKnO_4$ (4 wt %).

TABLE 5

| Slurry No. | Abrasive particles | $Fe^{3+}$ [mmol/kg] | Borate [mmol/kg] | Ratio of $Fe^{3+}$/ Borate | KMnO4 [mmol/kg] | NMR | Surface Roughness [Å] |
|---|---|---|---|---|---|---|---|
| S1 | alumina | 6.19 (0.074 wt %) | 40.3 | 1:6.5 | 253.2/ (4 wt %) | 2.26 | 1.6 |
| S11 | alumina | 3.40 (0.035 wt %) | 22.2 | 1:6.5 | 126.6 (2 wt %) | 1.75 | 1.6 |

TABLE 5-continued

| Slurry No. | Abrasive particles | $Fe^{3+}$ [mmol/kg] | Borate [mmol/kg] | Ratio of $Fe^{3+}$/ Borate | KMnO4 [mmol/kg] | NMR | Surface Roughness [Å] |
|---|---|---|---|---|---|---|---|
| S12 | alumina | 6.19 (0.074 wt %) | 40.3 | 1:6.5 | 63.3 (1 wt %) | 1.24 | 2.2 |
| S13 | alumina | 0.619 (0.007 wt %) | 4.03 | 1:6.5 | 253.2 (4 wt %) | 1.19 | 1.4 |
| C5 | alumina | 0.619 (0.0074 wt %) | 4.03 | 1:6.5 | 63.3 (1 wt %) | 0.48 | 1.4 |

Figure 2:
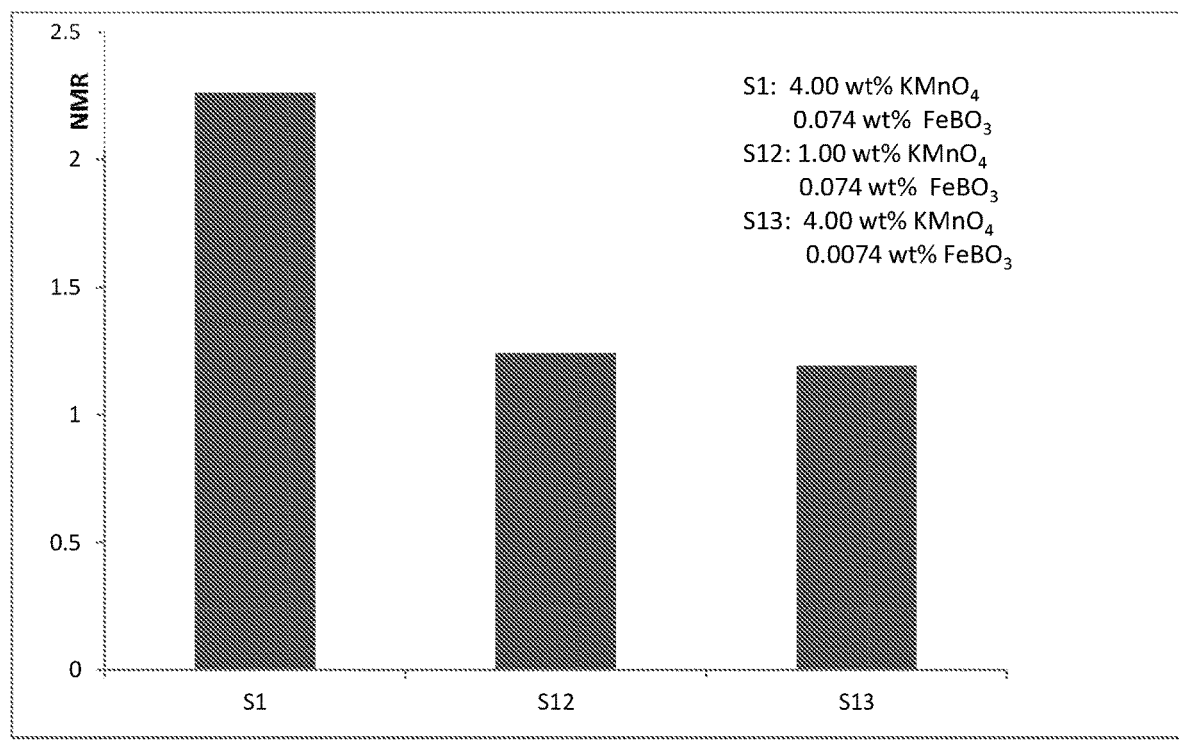
FIG. 2 includes a graph illustrating the NMR of polishing compositions by varying the amount of oxidizing agent and of iron(III)borate according to embodiments.

The polishing results for slurry S12 demonstrate that lowering the amount of KMnO₄ to a fourth of the amount used in slurry S1 (from 4 wt % (S1) to 1 wt % (S11)), but keeping the amount of iron borate the same as in S1, caused a strong decrease of the NMR from 2.26 to 1.24, see also FIG. 2. This result indicates again that the oxidizing agent plays in addition to the iron borate an important role for the material removal efficiency of the slurries, and both ingredients, iron borate and oxidizer, appear to work synergistically together. The example shows that if the amount of oxidizer reaches a certain minimum amount, it cannot be compensated by increasing the amount of iron borate.

As further shown in FIG. 2, lowering the amount of iron borate in slurry S13 to a tenth and keeping the amount of oxidizing agent the same as in slurry S1, also caused a strong decrease of the NMR from 2.26 to 1.19. This also indicates that both iron borate and the oxidizer are needed to provide a synergistic effect. It is remarkable, however, that slurry sample S13 had a higher NMR than the baseline slurry, showing that iron borate even at concentrations of 0.0074 wt % (0.619 mmol/kg) can have an effect on improving the polishing efficiency if combined with KMnO₄ in the same concentration amount as contained in the baseline slurry.

In comparative slurry C5, a four times lower amount of KMnO4 was used as in slurry S1, and furthermore the amount of iron borate was reduced to a tenth of the amount as in slurry S1. In this situation, the NMR of the slurry was worse than the removal rate of the baseline slurry used to calculate the NMR.

Description of the Polishing Testing:

All polishing slurries of the examples of the present disclosure were tested for the their influence on the material removal rate of 4° off-axis silicon carbide wafers using a Strasbaugh 6EC single sided polishing tool.

The polishing was conducted under the following conditions:

| | |
|---|---|
| Platen diameter (inches) | 22.0 |
| Runtime (min) | 10.0 |
| Down force (psi) | 9.0 |
| Platen speed (rpm) | 103 |
| Head speed (rpm) | 123 |
| PV (Down force · Platen speed) | 533.9 lbs/in · s |
| PV (Down force · Platen speed) | 9554 kg/m · s |
| Head speed/platen speed | 1.19 |
| Flow (ml/min) | 48 |
| flow rate/platen area | 0.126 ml/in² min |
| Polishing pad | IC1000 |

The substrates polished were 4H-type silicon carbide (4° off-axis) wafers having a diameter of 150 mm and a thickness of 350 μm. The material removal rate was calculated from the weight loss measured with an Ohaus Explorer Model FX324 precision scale.

The surface roughness was measured with a Zygo New View 8300+ scanning optical profiler.

A baseline removal rate in μm/hour was measured before the testing of each slurry and was conducted with the following base-slurry: 1 wt % alpha alumina (from Saint-Gobain), 4 wt % KMnO₄, 95 wt % distilled water, adjusted to the pH of the slurry to be tested (which was in most slurries a pH of 2.1, except indicated otherwise). After measuring the baseline removal rate, the polishing efficiency of the investigated slurry was measured in μm/hour. For the calculation of the normalized removal rate (NMR), the actual material removal rate of the tested slurry (MRR) was divided by the baseline removal rate (BRR).

A summary of the measured actual material removal rates (MRR), the corresponding baseline removal rates (BRR) (measured always before the testing of a slurry composition), and the calculated normalized removal rate (NMR), with NMR=MMR/BRR, for all slurry compositions S1 to S13 and comparative slurries C1 to C5 are shown in Table 6.

TABLE 6

| Slurry No. | Actual Material Removal Rate (MRR) [μm/hr] | Baseline Material Removal Rate (BRR) [μm/hr] | Normalized Material Removal Rate [NMR] |
|---|---|---|---|
| S1 | 3.88 | 1.72 | 2.26 |
| S2 | 3.64 | 2.14 | 1.70 |
| S3 | 3.84 | 2.23 | 1.72 |
| S4 | 4.05 | 2.23 | 1.82 |
| S5 | 3.71 | 2.36 | 1.57 |
| S6 | 3.12 | 2.23 | 1.40 |
| S7 | 2.03 | 2.07 | 0.98 |
| S8 | 5.81 | 2.23 | 2.61 |
| S9 | 4.32 | 1.70 | 2.54 |
| S10 | 4.22 | 1.70 | 2.48 |
| S11 | 2.47 | 1.41 | 1.75 |
| S12 | 2.91 | 2.34 | 1.24 |
| S13 | 3.08 | 2.58 | 1.19 |
| C1 | 2.77 | 1.81 | 1.53 |
| C2 | 2.00 | 1.50 | 1.33 |
| C3 | 2.52 | 2.37 | 1.06 |
| C4 | 2.17 | 2.23 | 0.97 |
| C5 | 0.75 | 1.56 | 0.48 |

Example 6

Two-package kit.

A kit is prepared including two packages. The first package includes Fe(NO₃)₃ and water. The second package of the kit includes alumina particles, KMnO₄, boric acid, and water. The amount of the ingredients in each package is adjusted that after the combination of package 1 with package 2, without adding further water and without adjusting the pH, the polishing composition (Sample S14) made from the kit contains 4 wt % KMnO₄, 1.25 wt % boric acid, 0.2 wt % alumina particles, and 1.25 wt % Fe(NO)₃. The pH of the obtained polishing composition is 2.1.

The kit is tested for its polishing efficiency of polishing a silicon carbide substrate after different amount of days storage at room temperature. Fluid compositions are prepared from the two-package kit as described above after 20 days, 40 days, 50 days, and 70 days storage of the two-package kit. There is no decline observed in the polishing efficiency (material removal rate) of the fluid compositions made from the kit within the time frame of 70 days.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

What is claimed is:

1. A composition comprising: abrasive particles; a multi-valent metal borate; at least one oxidizing agent; and a solvent.

2. The composition of claim 1, wherein the multi-valent metal borate includes iron(III)borate, copper(II)borate, cobalt(II)borate, bismuth(III)borate, aluminum(III)borate, cerium(III)borate, chromium(III)borate, ruthenium(III)borate, titanium(III)borate, lead(II)borate, or any combination thereof.

3. The composition of claim 2, wherein the multi-valent metal borate consists essentially of iron(III)borate.

4. The composition of claim 1, wherein the at least one oxidizing agent includes a permanganate, a peroxydisulfate, a peroxide, a chlorite, a perchlorate, a hypochlorite, a nitrite, a hyponitrite, an iodate, a periodate, a chromate, manganese oxide, or any combination thereof.

5. The composition of claim 4, wherein the at least one oxidizing agent consists essentially of a permanganate.

6. The composition of claim 1, wherein an amount of the multi-valent metal borate is at least 0.01 wt % and not greater than 20 wt % based on the total weight of the composition.

7. The composition of claim 1, wherein an amount of the at least one oxidizing agent is at least 0.01 wt % and not greater than 20 wt based on the total weight of the composition.

8. The composition of claim 1, wherein the abrasive particles include zirconia or alumina.

9. The composition of claim 1, wherein an amount of the abrasive particles is at least 0.1 wt % and not greater than 10 wt % based on the total weight of the composition.

10. The composition of claim 1, wherein the composition is adapted for chemical mechanical polishing of a substrate.

11. The composition of claim 10, wherein the substrate includes a metal, a metal alloy, a group III-V compound, a group IV-IV compound, or a polymer.

12. The composition of claim 11, wherein the substrate includes silicon carbide.

13. A method of polishing a substrate, comprising:
   providing a polishing composition, wherein the polishing composition comprises abrasive particles, a multi-valent metal borate, at least one oxidizing agent and water;
   bringing the polishing composition in contact with the substrate; and
   polishing the substrate.

14. The method of claim 13, wherein the multi-valent metal borate includes iron(III)-borate.

15. The method of claim 13, wherein the substrate includes a metal, a metal alloy, a polymer, a group III-V compound, or a IV-IV compound.

16. The method of claim 13, wherein the pH is adjusted to a pH of at least 1 and not greater than 5.

* * * * *